United States Patent Office 3,422,380
Patented Jan. 14, 1969

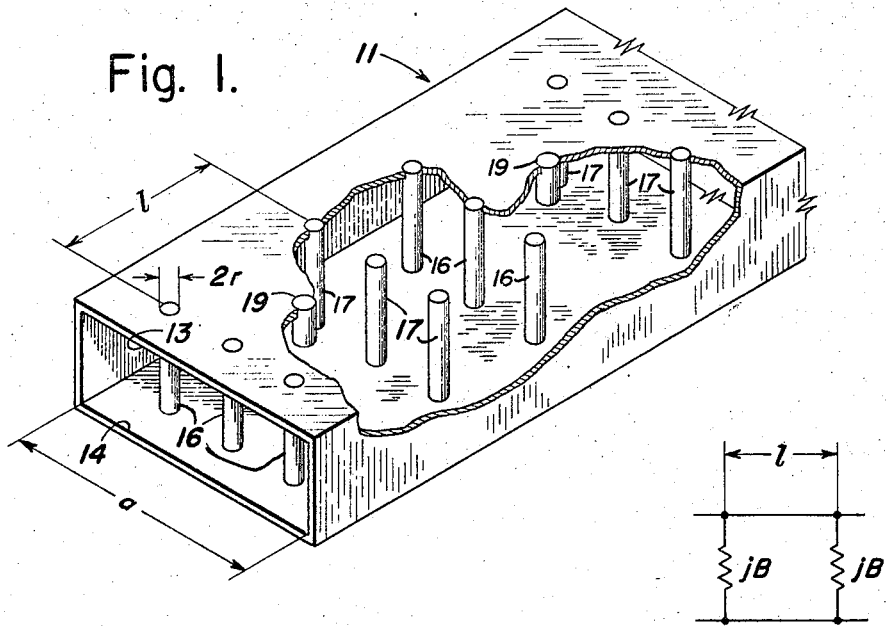
Fig. 1.
Fig. 2.
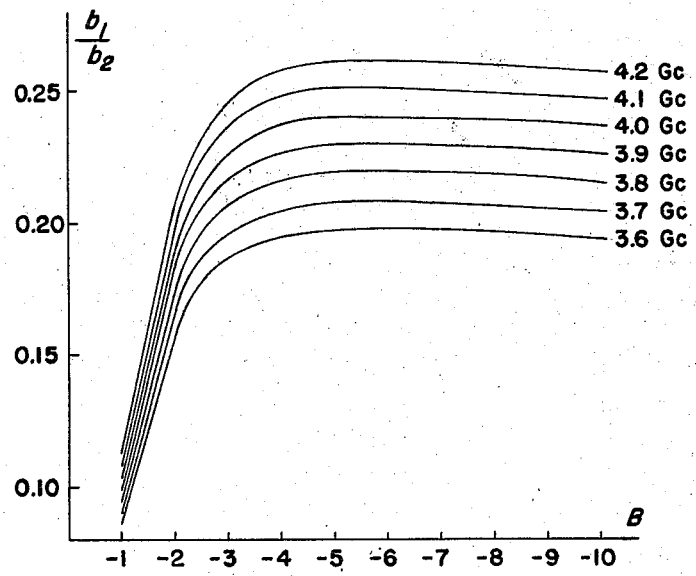
Fig. 3.
INVENTORS
Takaji Kuroda
Susumu Kitazume

3,422,380
TEMPERATURE COMPENSATED MULTIELEMENT WAVEGUIDE DEVICE HAVING SUSCEPTANCE ELEMENTS
Takaji Kuroda and Susumu Kitazume, Tokyo, Japan, assignors to Nippon Electric Company, Limited, Minato-ku, Tokyo-to, Japan, a corporation of Japan
Filed Aug. 8, 1966, Ser. No. 570,865
Claims priority, application Japan, Aug. 11, 1965, 40/48,893
U.S. Cl. 333—83  14 Claims
Int. Cl. H01p 7/06

ABSTRACT OF THE DISCLOSURE

A rectangular waveguide cavity resonator having temperature compensation and including a plurality of susceptance elements disposed in spaced relation interiorly of the waveguide in a manner normal to the broad sides thereof and in a further manner to dispose certain susceptance elements along a longitudinal axis of the waveguide. An initial frequency characteristic provided in the resonator varied in response to ambient temperature changes. To compensate for such temperature changes, the waveguide is made of Invar and the susceptance elements are formed of approximately 95% silver to provide a predetermined ratio between the linear thermal expansion coefficient of the waveguide Invar and the linear thermal expansion coefficient of the susceptance element silver for maintaining the predetermined frequency characteristic substantially invariant with ambient temperature changes.

---

This invention relates to a rectangular waveguide device, and more specifically to such device constituting a cavity resonator or a waveguide band-pass filter having the waveguide and the susceptance elements provided with temperature compensation.

It is known in a waveguide device comprising a waveguide and at least two susceptance elements arranged within the waveguide in an array along the axis thereof that temperature variations of the waveguide and the susceptance elements result in a change of the frequency characteristic of the device. It is also known that a 50-degree centigrade temperature variation, for example, in a cavity resonator of the foregoing kind designed for use in 4 gc. frequency band causes, in case brass is used for both the waveguide and the susceptance elements, a frequency deviation of the order of 4 mc. in the center frequency of such resonator.

The object of the present invention is therefore to provide a rectangular waveguide device which comprises at least two susceptance elements and which is simple in construction and yet does not suffer from a change of frequency characteristic resulting from temperature variations.

According to a specific embodiment of this invention, there is provided a waveguide device which comprises a rectangular waveguide and at least two susceptance elements arranged within the waveguide in an array along the axis of the waveguide to constitute a cavity resonator or a filter. Materials forming the waveguide and the susceptance elements are so selected that the ratio of the linear thermal expansion coefficients thereof is provided with a predetermined value for preventing the resonance frequency of the cavity resonator or filter from varying with changes in the temperature of the waveguide and the susceptance elements.

The invention is hereinafter explained with reference to the accompanying drawing, in which:

FIG. 1 is an isometric view of a specific embodiment of the invention having an exposed inner portion;
FIG. 2 is an equivalent electrical circuit of a section of FIG. 1; and
FIG. 3 is a set of curves usable for the manufacture of the invention in FIG. 1.

Referring to FIGS. 1 and 2, a waveguide device to which the instant invention relates comprises: a rectangular waveguide 11, at least two susceptance elements 16 and 17 having a radius $r$ and arranged in an array along an axis of the waveguide. These elements have their ends electrically attached to broad walls 13 and 14 of width $a$ of the waveguide. An adjustment screw 19 is mounted in one broad waveguide wall intermediate susceptance elements 16 and 17 along an axis of the waveguide and projecting into the interior thereof for adjusting in equivalence the distance $l$ between the susceptance elements 16 and 17. The waveguide device shown in FIG. 1 ments, such as a single susceptance element 16 in combination with a single susceptance element 17, both placed along the axis of the waveguide, rather than the first variety of cavity resonator as previously described composed of a first set of three susceptance elements 16 arranged in a plane perpendicular to the axis of the waveguide and another set of three susceptance elements 17 arranged in a similar plane parallel to the first-mentioned plane as illustrated in FIG. 1. Such second variety of cavity resonators have an equivalent circuit shown in FIG. 2 wherein susceptances B ($j$ is the imaginary unit to be given later) are connected in parallel and spaced apart by a distance $l$.

For such second variety of cavity resonator, the guided wavelength $L_g$ of the microwave resonance frequency is given by equation:

(1) $$L_g \doteq 2l/n$$

wherein $n$ is an integer. Therefore, the condition for resonance is given by equation:

(2) $$L_g = 2\pi l/\arctan(2/B)$$

where the susceptance B is given; in case the susceptance elements forming an end of the cavity resonator are three in number and arranged with equal spacing between the narrow walls of the waveguide, the susceptance is given by equation:

(3) $$B = -\frac{4L_g}{a\left[\ln\dfrac{a}{24.66r} + \dfrac{40.4a^2}{1000L_g^2}\right]}$$

and in case the number of susceptance elements is one, the susceptance is given by equation:

(4) $$B = -\frac{2L_g}{a\left[\ln\dfrac{2a}{\pi r} - 2\right]}$$

When the temperature of this cavity resonator rises by $\Delta t$, the frequency characteristic thereof varies mainly by variations in (a) the distance $l$ between the end susceptance elements 16 and 17 and (b) the diameter $2r$ of the susceptance element 16 or 17 and additionally by variations in (c) the effective length of adjustment screw 19 in the interior of the waveguide. The variation of the guided wavelength $L_g$ caused by the variation in the distance $l$ between the end susceptance elements 16 and 17 is given, from the Equation 1, by equation:

(5) $\quad \Delta_l L_g = 2\Delta l = 2lb_1\Delta t$ where $b_1$ is the linear thermal expansion coefficient of the waveguide. The change caused by the change in the radius $r$ of the susceptance elements 16 and 17 in the susceptance B given by the Equation 3 is, from the Equation 3:

(6) $\quad \Delta_r B = -\dfrac{B^2}{4rL_g \log \dfrac{e}{a}}\Delta r = -\dfrac{aB^2}{4L_g \log e}b_2\Delta t$ where $b_2$ is the linear thermal expansion coefficient of the susceptance elements (and $e$ is the base of the natural logarithm). Consequently, the variation of the guided wavelength $L_g$ arising from the change of the radius $r$ of the susceptance elements 16 and 17 is:

(7) $\quad \Delta_r L_g = \dfrac{4\pi l}{\left(\text{arc tan}\dfrac{2}{B}\right)^2 (4+B^2)}\Delta_r B$ $\quad\quad = -\dfrac{a\pi l}{\left(\text{arc tan}\dfrac{2}{B}\right)^2 (4+B^2)L_g \log e}b_2\Delta t$ from the Equations 2 and 6. Incidentally, variations of the guided wavelength $L_g$ arising from the width $a$ of the broad wall of the waveguide are negligible as compared with variations of the guided wavelength $L_g$ caused by variations of the distance $l$ between or the radius $r$ of the susceptance elements 16 and 17, for both cases where the susceptance is given by Equations 3 and 4. Comparison of Equations 6 and 7 shows that in case the number of the susceptance elements forming an end of the cavity resonator is three, selection of the materials forming the waveguide and the susceptance elements 16 and 17 such that (8) $\quad \dfrac{b_1}{b_2} = \dfrac{na\pi}{2L_g \log e} \dfrac{B^2}{\left(\text{arc tan}\dfrac{2}{B}\right)^2 (4+B^2)}$ makes the resonance frequency invariant with changes in the temperature of the cavity resonator. In case only one susceptance element forms an end of the cavity resonator, it is sufficient to satisfy the condition such that (9) $\quad \dfrac{b_1}{b_2} = \dfrac{na\pi}{L_g \log e} \dfrac{B^2}{\left(\text{arc tan}\dfrac{2}{B}\right)^2 (4+B^2)}$ namely, to select twice as large a ratio $b_1/b_2$ of the linear thermal expansion coefficient $b_1$ of the material for the waveguide to the linear thermal expansion coefficient $b_2$ of the material for the suspectance elements 16 and 17 as that for the case where the number of the abovementioned susceptance elements is three.

Referring to FIG. 3 wherein the abscissa represents the susceptance B appearing in the equivalent circuit of a waveguide cavity resonator and the ordinate stands for the ratio of the linear thermal expansion coefficient of the material for the waveguide to that of the material for the susceptance elements, curves of the Equation 8 are plotted for $n=1$ or the fundamental mode in a waveguide of the IEC–R–40 type, with the resonance frequency of the waveguide cavity resonator serving as the parameter. Inasmuch as it is usual in a waveguide cavity resonator to choose a value between about $-4$ to $-10$ for the susceptance B, it is advisable for a band-pass filter composed of one or a plurality of cascaded cavity resonators, each comprising an IEC–R–40 waveguide and susceptance elements arranged within the waveguide in two planes which are perpendicular both to the axis of the waveguide and to the broad wall thereof, to set the ratio $b_1/b_2$ at a value between 0.20 and 0.26 in case the number of the susceptance elements forming an end of the cavity resonator is three, and at a value between 0.4 and 0.5 in case such a number is one. For example, it is desirable to use ($b_1/b_2=0.23$) easily workable Invar ($b_1=4.4\times10^{-6}$) for the waveguide and silver ($b_2=19\times10^{-6}$)

for the susceptance elements. Incidentally, it is understood that in case a band-pass filter is to be made by way of cascading a cavity resonator whose susceptance B is $-1$ and another cavity resonator whose susceptance is $-5$, it is possible to use the same material for the common waveguide and different materials for the susceptance elements.

In practice, a four-stage filter whose pass-band was 3930 mc. $\pm10$ mc. and whose attenuation beyond 80 mc. above and below the center frequency was more than 35 db, was made with an IEC–R–40 waveguide by connecting in cascade four cavity resonators, each of which was defined on one end by three susceptance elements and possessed of equivalent susceptance of $-4$, and two more, similarly defined but provided with equivalent susceptance of $-7$, and the temperature was raised from $-30°$ C. to $+70°$ C. In the case wherein the waveguide and the susceptance elements were all made of easily workable Invar, the center frequency would have decreased by 1.2 mc. according to the Equations 5 and 7. No material variation of the frequency characteristic was observed in the case ($b_2/b_2=0.23$) wherein the waveguide was made of easily workable Invar ($b_1=4.4\times10^{-6}$) and the susceptance elements were made of 95% silver ($b_2=18.9\times10^{-6}$)

Although the above description is concerned with waveguide cavity resonators having on the both ends specific arrangements of the susceptance elements, it is appreciated that the temperature compensation for the case of other arrangement is attainable through similar calculation.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:
1. A cavity resonator comprising:
   a rectangular waveguide,
   a plurality of susceptance elements disposed in spaced relation interiorly of said waveguide between and normal to opposite broad surfaces thereof for providing said resonator with a predetermined resonant frequency; and
   said waveguide and elements formed of such preselected materials as to provide a predetermined ratio between the linear thermal expansion coefficient of said waveguide material and the linear thermal expansion coefficient of said elements material for maintaining said predetermined resonant frequency substantially invariant with changes in the temperatures of said waveguide and elements.
2. The cavity resonator according to claim 1 in which said plurality of said susceptance elements comprises at least two thereof,
   said last-mentioned two elements further disposed as to lie in a plane normal to said waveguide broad surfaces and including a longitudinal axis of said waveguide.
3. The cavity resonator according to claim 1 in which at least one of said plurality of said susceptance elements is so disposed in proximity of an end of said waveguide as to lie in a plane normal to said waveguide broad surfaces and including a longitudinal axis of said waveguide.
4. The cavity resonator according to claim 1 in which at least two of said plurality of susceptance elements are so disposed in proximity of opposite ends of said waveguide that one of said two elements is disposed at one end of said waveguide and the other of said two elements is disposed at a waveguide end opposite to said one end, said two elements also disposed in a plane normal to said waveguide broad surfaces and including a longitudinal axis of said waveguide.

5. The cavity resonator according to claim 1 in which at least three of said plurality of said susceptance elements are disposed in proximity of one end of said waveguide as to lie in a first plane normal both to said waveguide broad surfaces and a second plane including a longitudinal axis of said waveguide, said second plane disposed normal to said last-mentioned broad surfaces, a middle one of said last-mentioned three elements disposed in an intersection of said first and second planes.

6. The cavity resonator according to claim 5 in which an additional three of said plurality of susceptance elements are so disposed in proximity of an opposite end of said waveguide as to lie in a third plane spaced from and parallel with said first plane, said third plane being also normal to said second plane,
a middle one of said last-mentioned three elements being disposed in an intersection of said second and third planes.

7. The resonator according to claim 1 in which said preselected materials comprise two different materials,
one of said two different materials being easily workable Invar forming said waveguide and a second of said two different materials being substantially silver forming each of said elements.

8. The resonator according to claim 5 in which said predetermined ratio is between 0.20 and 0.26.

9. The resonator according to claim 3 in which said predetermined ratio is between 0.4 and 0.5.

10. A cavity resonator comprising:
a rectangular waveguide,
and a plurality of susceptance elements disposed in spaced relation interiorly of said waveguide between and normal to broad surfaces thereof for providing said resonator with a predetermined resonant frequency,
said elements so disposed that a preselected number thereof lies in proximity of each of two opposite open ends of said waveguide in two parallel planes which are perpendicular to a third plane including an axis of said waveguide,
said waveguide formed of easily workable Invar and said plurality of elements formed of approximately 95 percent silver whereby a predetermined ratio between linear thermal expansion coefficients of said Invar and silver has such value as to maintain said predetermined resonant frequency substantially invariant regardless of temperature changes in said waveguide and elements.

11. The cavity resonator according to claim 10 in which said preselected number of elements disposed in proximity of each of said waveguide open ends comprises three of said elements,
said three elements at each of said waveguide open ends so disposed in one of said two parallel planes that a middle element lies at an intersection of each of said two parallel planes and said third plane,
said predetermined ratio having a value between 0.20 and 0.26.

12. The cavity resonator according to claim 10 in which said preselected number of elements disposed in proximity of each of said waveguide open ends comprises one of said elements,
said element at each of said waveguide open ends so disposed in one of said two parallel planes as to lie at an intersection of each of said two parallel planes and said third plane,
said predetermined ratio having a value between 0.4 and 0.5.

13. A waveguide filter comprising a plurality of resonators connected in cascade,
each of said resonators comprising a rectangular waveguide and a preselected number of susceptance elements disposed in spaced relation interiorly of said waveguide in a manner normal to broad surfaces thereof to provide each of said resonators with a predetermined resonant frequency,
at least one of said resonators having a susceptance of —1 and at least second of said resonators having a a susceptance of —5,
each of said waveguides being formed of easily workable Invar and each of said elements formed of approximately 95 percent silver whereby a predetermined ratio is established between linear thermal expansion coefficients of said Invar and silver for maintaining said predetermined resonant frequency in an invariant manner in each of said resonators regardless of temperature changes in said waveguide and elements associated therewith.

14. A four-stage filter comprising:
four resonators connected in cascade, each of said resonators including:
a waveguide;
a plurality of susceptance elements disposed interiorly of said waveguide between and normal to broad surfaces thereof to provide a predetermined resonant frequency for each resonator,
each of said resonators also including three of said elements so disposed at one end of said waveguide included therein so as to lie in a first plane normal both to said waveguide broad surfaces and a second plane normal to said last-mentioned broad surfaces and including an axis of said waveguide,
a middle element of each of said three elements in each of said waveguide disposed in an intersection of said first and second planes,
two of said four resonators provided with a susceptance of —4 and the remaining two of said resonators provided with a susceptance of —7,
each of said waveguides formed of easily workable Invar having a linear thermal expansion coefficient $(4.4 \times 10^{-6})$ and each of said elements formed of approximately 95 percent silver having a linear thermal expansion coefficient $(18.9 \times 10^{-6})$ whereby a ratio of said Invar coefficient to said silver coefficient has a value of the order of 0.23 for maintaining said predetermined resonant frequency in a substantially invariant manner in said resonator associated with each of said last-mentioned waveguides regardless of temperature changes in said waveguides and elements in a range from approximately —30° centigrade to +70° centigrade.

References Cited

UNITED STATES PATENTS 2,486,129  10/1949  De Walt et al.
2,629,015  2/1953  Reed.
3,164,792  1/1965  Georgrev.

HERMAN KARL SAALBACH, *Primary Examiner.*

L. ALLAHUT, *Assistant Examiner.*

U.S. Cl. X.R.

333—73

UNITED STATES PATENT OFFICE
CERTIFICATE OF CORRECTION

Patent No. 3,422,380

January 14, 1969

Takaji Kuroda et al.

It is certified that error appears in the above identified patent and that said Letters Patent are hereby corrected as shown below:

Column 2, line 19, "ments, such as a single susceptance element 16 in com-" should read -- constitutes, for example, a waveguide band-pass filter --; line 43, "wherein" should read -- where --. Column 3, line 56, "suspectance" should read -- susceptance --. Column 4, line 29, "($b_2/b_2=0.23$)" should read -- ($b_1/b_2=0.23$) --. Column 6, line 60, "30° centrigrade" should read -- 30° centigrade --.

Signed and sealed this 24th day of March 1970.

(SEAL)

Attest:

Edward M. Fletcher, Jr.

Attesting Officer

WILLIAM E. SCHUYLER, JR.

Commissioner of Patents